(12) United States Patent
Yokoyama (10) Patent No.: US 8,819,459 B2
(45) Date of Patent: Aug. 26, 2014

(54) REDUCING POWER CONSUMPTION IN CLUSTER SYSTEM OF MUTUAL STANDBY TYPE

(75) Inventor: Jun Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 280 days.

(21) Appl. No.: 13/413,564

(22) Filed: Mar. 6, 2012

(65) Prior Publication Data

US 2012/0233475 A1    Sep. 13, 2012

(51) Int. Cl.
*G06F 1/00* (2006.01)
*G06F 1/32* (2006.01)
*G06F 15/177* (2006.01)
*G06F 15/00* (2006.01)
*G06F 11/00* (2006.01)

(52) U.S. Cl.
USPC ........... 713/300; 713/320; 709/221; 709/222; 712/28; 714/4.11; 714/10

(58) Field of Classification Search
CPC .... Y02B 60/142; G06F 1/3206; G06F 11/202
USPC ............. 713/300, 320; 709/221, 226; 712/28; 714/11.4, 10
See application file for complete search history.

(56) References Cited

U.S. PATENT DOCUMENTS

| | | | | |
|---|---|---|---|---|
| 3,623,014 A | * | 11/1971 | Doelz et al. | ................... 714/6.12 |
| 6,219,801 B1 | * | 4/2001 | Yuge et al. | ...................... 714/13 |
| 7,873,867 B2 | | 1/2011 | Ikawa et al. | |
| 8,041,914 B2 | * | 10/2011 | Fukatani et al. | ............... 711/165 |
| 8,065,538 B2 | * | 11/2011 | Odlund | .......................... 713/300 |
| 8,281,007 B2 | * | 10/2012 | Goto et al. | ..................... 709/225 |
| 2003/0079151 A1 | * | 4/2003 | Bohrer et al. | .................. 713/320 |

FOREIGN PATENT DOCUMENTS

| | | |
|---|---|---|
| JP | 11-353292 A | 12/1999 |
| JP | 2003-162515 A | 6/2003 |
| JP | 2009-32045 A | 2/2009 |
| JP | 2009-193385 A | 8/2009 |
| JP | 2011-22750 A | 2/2011 |

OTHER PUBLICATIONS

Japanese Office Action dated Jan. 22, 2013, with English translation.

* cited by examiner

*Primary Examiner* — Stefan Stoynov
(74) *Attorney, Agent, or Firm* — McGinn IP Law Group, PLLC (57) ABSTRACT

A cluster system of mutual standby type forms groups each composed of a job execution system and a job standby system for taking over the job when problems occur in the job execution system, and provides information processing devices each with a job execution system and a job standby system of different groups. The information processing devices each include: an upper limit value storage unit for storing a power upper limit value, a power control unit for controlling use of power by its own information processing device so as not to exceed the power upper limit value stored, and an upper limit value setting unit for causing the upper limit value storage unit to store a power upper limit value smaller than the maximum power consumption of its own information processing device when it is not necessary to take over the job of another information processing device.

18 Claims, 6 Drawing Sheets

REDUCING POWER CONSUMPTION IN CLUSTER SYSTEM OF MUTUAL STANDBY TYPE

INCORPORATION BY REFERENCE

The present application claims priority from Japanese Patent Application No. 2011-51101, filed on Mar. 9, 2011 in Japan, the disclosure of which is incorporated herein by reference in its entirety.

TECHNICAL FIELD

The present invention relates to cluster systems and, in particular, to techniques for reducing power consumption.

BACKGROUND ART

Cluster systems have realized a high availability when a plurality of information processing devices (server computers, for example) are connected on a network and problems occur in any of the information processing devices by letting other information processing devices take over and carry out the process which was being carried out by the information processing device in trouble. However, because cluster systems have a redundant configuration, compared with non-cluster systems, the power consumption is inclined to increase. Therefore, techniques for reducing the power consumption of cluster systems are important, especially for reducing the power consumption in normal operation, that is, in the redundant configuration without problems occurring in the system.

The following Patent 1 Document discloses an example of the techniques for reducing the power consumption of cluster systems in normal operation. The technique disclosed in the Patent Document 1 reduces the power consumption in normal operation by putting the information processing devices in an idle state into an operation stop state for a cluster system composed of a plurality of information processing devices. In more detail, an information processing device without jobs to process is shifted into a suspending state. Then, when applications are coming up and assigned to that information processing device, job processing is carried out by resuming the information processing device.

[Patent Document 1] JP 2003-162515 A

However, there is a mutual standby type as one kind of the cluster systems. A cluster system of the mutual standby type operates the respective information processing devices as execution systems while letting them serve as standby systems for each other at the same time. More particularly, a job execution system and a job standby system are taken as one group, and the job standby system serves to take over the job when problems occur in the job execution system. Then, the information processing devices each have job execution systems and job standby systems of different groups, and monitor each other while carrying out the jobs of the execution systems. Then, if some other information processing device falls into astute of being not possible to continue the process, then the job is taken over by the job standby system of the relevant information processing device belonging to the same group of the job execution system of the other information processing device falling into the state of being not possible to continue the process. Therefore, in a cluster system of mutual standby type, there are no information processing devices in an idle state in normal operation. Hence, the technique disclosed in the aforementioned Patent Document 1 is not applicable, and thus it is necessary to reduce the power consumption in normal operation by some other method. However, at present, there have not been any effective techniques proposed therefor.

SUMMARY

An exemplary object of the present invention is to solve the problem described hereinabove, that is, the problem of being difficult to reduce the power consumption of the cluster systems of mutual standby type in normal operation.

An aspect in accordance with the present invention provides a cluster system of mutual standby type configured to form groups each composed of a job execution system, and a job standby system for taking over the job when problems occur in the job execution system; and provide information processing devices each with a job execution system and a job standby system of different groups, wherein the information processing devices monitor one another while carrying out the jobs of the execution systems and, when some other information processing device becomes unable to continue processing, take over that job with the job standby system of its own information processing device in the same group as the job execution system of the other information processing device unable to continue processing, the information processing devices each including: an upper limit value storage unit for storing a power upper limit value; a power control unit for controlling the use of power by its own information processing device so as not to exceed the power upper limit value stored in the upper limit value storage unit; and an upper limit value setting unit for causing the upper limit value storage unit to store a power upper limit value smaller than the maximum power consumption of its own information processing device when it is not necessary to take over the job of another information processing device.

Further, another aspect in accordance with the present invention provides an information processing device configured to form groups each composed of a job execution system, and a job standby system for taking over the job when problems occur in the job execution system, have a job execution system and a job standby system of different groups, and take over that job with the job standby system of its own information processing device in the same group as the job execution system of another information processing device which becomes unable to continue processing, the information processing device including: an upper limit value storage unit for storing a power upper limit value; a power control unit for controlling the use of power by its own information processing device so as not to exceed the power upper limit value stored in the upper limit value storage unit; and an upper limit value setting unit for causing the upper limit value storage unit to store a power upper limit value smaller than the maximum power consumption of its own information processing device when it is not necessary to take over the job of another information processing device.

Further, still another aspect in accordance with the present invention provides a power management method of an information processing device to be carried out by the information processing device forming groups each composed of a job execution system, and a job standby system for taking over the job when problems occur in the job execution system, having a job execution system and a job standby system of different groups, taking over that job with the job standby system of its own information processing device in the same group as the job execution system of another information processing device which becomes unable to continue processing, and including an upper limit storage unit for storing a power upper limit value, the power management method including: causing the upper limit value storage unit to store a power upper limit value smaller than the maximum power consumption of its own information processing device when it is not necessary to take over the job of another information processing device; and controlling the use of power by its own information processing device so as not to exceed the power upper limit value stored in the upper limit value storage unit.

Because the present invention is configured in the above manner, it is possible to reduce the power consumption of the cluster systems of mutual standby type in normal operation.

EXEMPLARY EMBODIMENTS

Hereinbelow, referring to the accompanying drawings, exemplary embodiments of the present invention will be explained in detail.

A First Exemplary Embodiment

Figure 1:
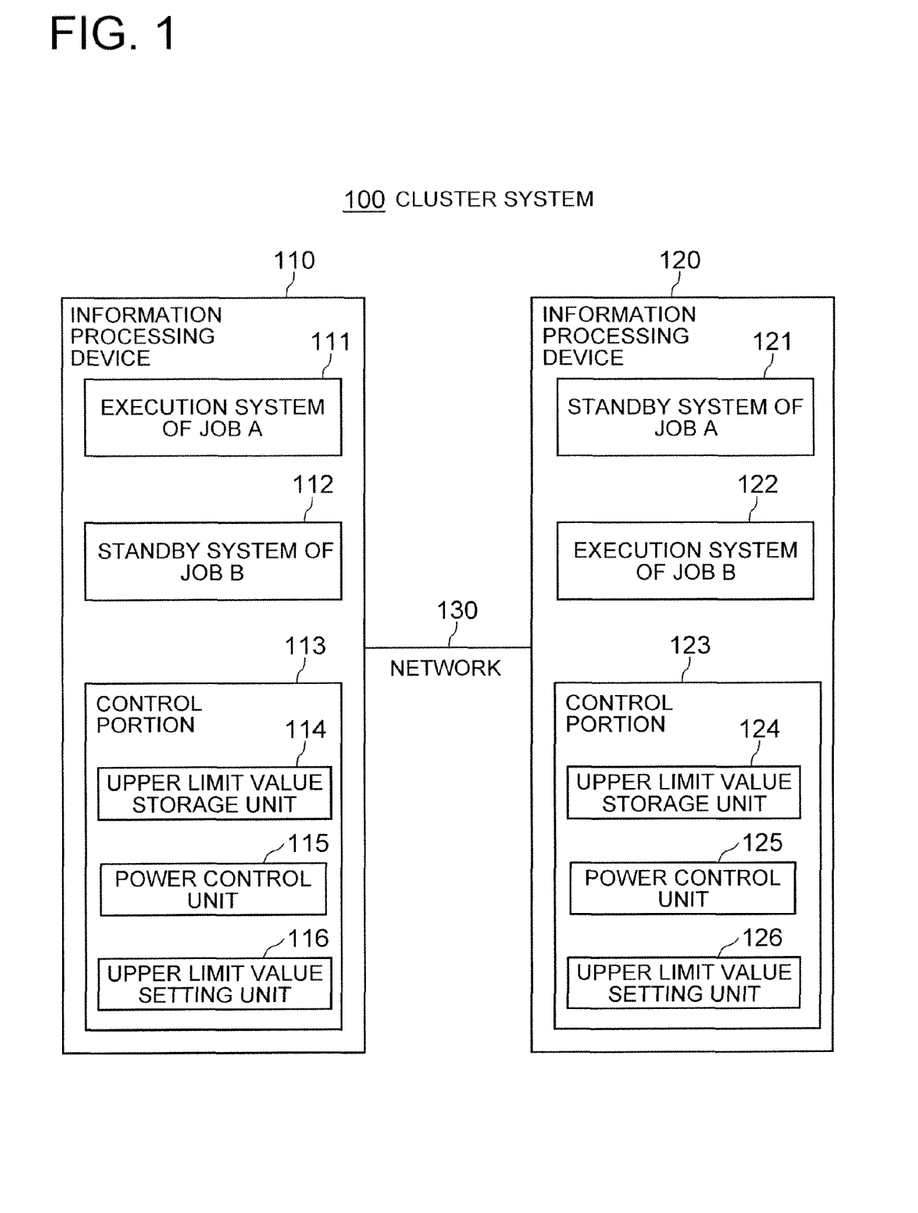
FIG. 1 is a block diagram of a first exemplary embodiment in accordance with the present invention.

Referring to FIG. 1, a cluster system 100 in accordance with the first exemplary embodiment of the present invention is composed of two information processing devices 110 and 120, and a network 130 such as a LAN and the like for connecting the two devices in a mutually communicable manner.

The information processing device 110 and the information processing device 120 have a fail-over function for taking over and carrying out a job process which was carried out by the other information processing device in which problems are occurring. In the first exemplary embodiment, the information processing device 110 has an execution system 111 of a job A, a standby system 112 of a job B, and a control portion 113, while the information processing device 120 has a standby system 121 of the job A, an execution system 122 of the job B, and a control portion 123.

The control portion 113 of the information processing device 110 causes the execution system 111 to carry out the process for the job A, and stops the operation of the standby system 112 for carrying out the process for the job B, when the cluster system 100 is in a normal state. On the other hand, the control portion 123 of the information processing device 120 causes the execution system 122 to carry out the process for the job B, and stops the operation of the standby system 121 for carrying out the process for the job A, when the cluster system 100 is in a normal state. The control portion 113 and the control portion 123 mutually monitor whether or not there are any problems in the other device by, for example, monitoring each other's heartbeat signal through the network 130. Then, if problems are occurring in the information processing device 110, then the control portion 123 of the information processing device 120 switches the standby system 121 of the job A to the execution system to carry out the process for the job A in the information processing device 120. Further, if problems are occurring in the information processing device 120, then the control portion 113 of the information processing device 110 switches the standby system 112 of the job B to the execution system to carry out the process for the job B in the information processing device 110.

Further, in the first exemplary embodiment, in order to reduce the power consumption in normal operation, the control portion 113 has an upper limit value storage unit 114, a power control unit 115, and an upper limit value setting unit 116, while the control portion 123 has an upper limit value storage unit 124, a power control unit 125, and an upper limit value setting unit 126.

The upper limit value storage unit 114 of the information processing device 110 has a function of storing an upper limit of the power consumption of the information processing device 110.

The power control unit 115 has a function of controlling the power consumption of the information processing device 110 not to exceed the power upper limit stored in the upper limit value storage unit 114. An arbitrary method may be adopted to keep the power consumption of information processing devices under a certain value. For example, if the information processing device 110 has a processor operating at an operating frequency selected from a plurality of operating frequencies, then the power control unit 115 may control the power consumption of the information processing device 110 not to exceed a certain value by switching the operating frequency for the processor. Generally, if the operating frequency for the processor is lowered, then the power consumption decreases though processing performance drops such as computation speed and the like. As an example, the power control unit 115 has a table for maintaining information of the operating frequency corresponding to each of a plurality of power upper limits different in value. The power control unit 115 searches from the table the operating frequency corresponding to the power upper limit stored in the upper limit value storage unit 114, and changes the operating frequency for the processor such that the processor operates at the searched operating frequency.

The upper limit value setting unit 116 has a function of letting the upper limit value storage unit 114 store a power upper limit lower than the maximum power consumption of the information processing device 110 when the information processing device 110 does not need to take over the process of the information processing device 120. By virtue of this, the information processing device 110 is only allowed to deliver a performance lower than the maximum performance. To what degree of the performance allowable to deliver by the power upper limit may be either determined in the performance estimation at the stage of system design or dynamically determined by measuring the performance evaluation value such as throughput and the like during an actual operation while switching the power upper limits.

Further, the upper limit value setting unit 116 has a function of raising the power upper limit stored in the upper limit value storage unit 114 when it becomes necessary to take over the job B of the information processing device 120. This raising of the power upper limit may as well be carried out by letting the upper limit value storage unit 114 store a higher power upper limit. Alternatively, it may as well be carried out by removing the setting of a power upper limit per se, i.e., by disenabling the power restriction function of the power control unit 115.

Further, the upper limit value setting unit 116 has a function of returning the power upper limit stored in the upper limit value storage unit 114 to the value before being raised when it becomes unnecessary to take over the job B because the information processing device 120 has restored its normal state and the like. Alternatively, it may have a function of reenabling the disenabled power restriction function.

The upper limit value storage unit 124, the power control unit 125 and the upper limit value setting unit 126 of the information processing device 120 have the same functions as the upper limit value storage unit 114, the power control unit 115 and the upper limit value setting unit 116 of the information processing device 110, respectively.

Next, operations of the first exemplary embodiment will be explained.

When the cluster system 100 is operating normally, the information processing device 110 carries out the process for the job A, while the information processing device 120 carries out the process for the job B. At this time, the upper limit storage units 114 and 124 are set at power upper values lower than the maximum power consumptions of the information processing devices 110 and 120, which are therefore operating in low processing performances. However, in normal operation, since the information processing device 110 does not need to carry out the job B while the information processing device 120 does not need to carry out the job A, no obstacles may occur in processing the jobs A and B with low performances.

On the other hand, if problems occur in one information processing device, for example, in the information processing device 120, then it becomes necessary for the information processing device 110 to take over the job B which was carried out by the information processing device 120. Therefore, in order to improve the processing performance of the information processing device 110, the upper limit value setting unit 116 of the information processing device 110 raises the power upper limit stored in the upper limit value storage unit 114. By virtue of this, the information processing device 110 can carry out the process for the job B as well as the process for the job A without obstacles.

Thereafter, when the information processing device 120 has restored its normal state, the job B, which was carried out by the information processing device 110, comes back to the original information processing device 120 for processing. At this time, the upper limit value setting unit 116 of the information processing device 110 returns the power upper limit stored in the upper limit value storage unit 114 to the value before being raised. By virtue of this, the information processing device 110 returns to the state of operating in low performance.

According to the first exemplary embodiment in this manner, it is possible to reduce the power consumption of cluster systems of the mutual standby type in normal operation. The reason lies in that if a power upper limit is not set up, then when the processing load is temporarily increasing, information processing devices will carry out a process at the maximum speed to finish the process as quickly as possible. However, in carrying out a task, there are cases of better energy efficiency by taking time to carry out the task and finishing it as the same time as the deadline comes rather than finishing it before the deadline and resting in an idling state. Therefore, it is possible to reduce wasted power by setting up a power upper limit to prevent carrying out processes faster than a certain speed and thereby improving the energy efficiency.

Further, in other cases too, if the information processing devices 110 and 120 both carry out processes at the maximum speeds, then for the power supply system of supplying power to the information processing devices 110 and 120, it is necessary to be furnished with the capability of supplying the total power of summing up the maximum power consumptions of these two information processing devices, thereby elevating the scale of the necessary power supply facility. In contrast, by setting up a power upper limit, it is possible to restrain the total maximum power consumption of the information processing devices 110 and 120, thereby allowing the cost of the power supply system to be curtailed.

Further, according to the first exemplary embodiment, because the power upper limit is raised when becoming necessary to take over the process of another information processing device, it is possible to take over and carry out the process of the other information processing device without obstacles.

A Second Exemplary Embodiment

Outline

The second exemplary embodiment is intended to optimize the power in use by carrying out control to explicitly reduce the power consumption of unnecessary standby resources in cluster systems of mutual standby type and availability-improved type in the normal state, while allowing necessary resources to be utilized in emergency such as when problems occur, and the like. Therefore, the second exemplary embodiment explicitly reduces the power consumption of redundantly configured systems by controlling the operational state of the systems based on the definition information on the redundant portions manifested at the system design stage.

[Explanation of the Configuration]

Figure 2:
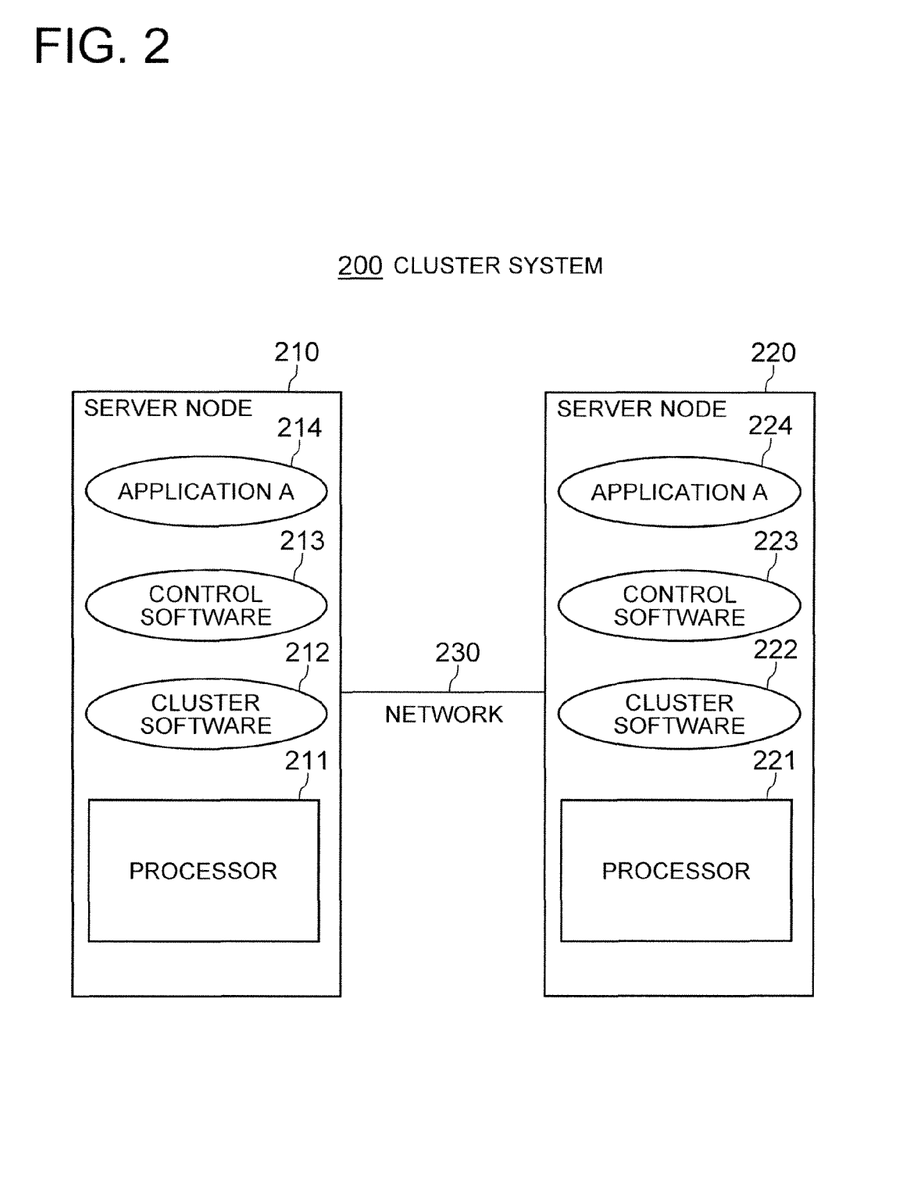
FIG. 2 is a block diagram of a second exemplary embodiment in accordance with the present invention.

Referring to FIG. 2, the second exemplary embodiment will be explained hereinbelow. A cluster system 200 of availability-improved type in accordance with the second exemplary embodiment is composed of a plurality of server nodes (server computers) 210 and 220 connected with each other through a network 230. The server node 210 has a processor 211, cluster software 212 operating on the processor 211, control software 213, and a program 214 of application A. The server node 220 has a processor 221, cluster software 222 operating on the processor 221, control software 223, and a program 224 of application B. In the second exemplary embodiment, two server nodes constitute one cluster group, but more than two server nodes may as well constitute one cluster group.

The cluster software members 212 and 222 are middleware for controlling the server nodes 210 and 220 as one member of the cluster system, respectively. The cluster software members 212 and 222 have a function for monitoring operational states of other server nodes than its own server node by utilizing a predetermined method such as carrying out communications with cluster software operating on other servers belonging to the same cluster group as its own server.

In the second exemplary embodiment, in addition to such existing cluster software members 212 and 222, each server node also has the control software 213 or 223. The control software members 213 and 223 can communicate with the cluster software members 212 and 222 operating on its own server node, confirm operational states, and receive the notification of change in operational state.

Further, the server nodes 210 and 220 of the second exemplary embodiment have a function for setting an upper limit of the maximum power consumption for its own server node and restricting the upper limit, and a function for investigating the setting upper limit of the maximum power consumption, by a predetermined method. On the other hand, the control software members 213 and 223 have a function for carrying out the setting and removing of the power upper limit. The control software members 213 and 223 store the upper limit of the maximum power consumption in normal operation and, based on this value, issue instruction of the upper limit of power consumption to its own server node.

Next, the operation of the second exemplary embodiment will be explained.

Figure 3:
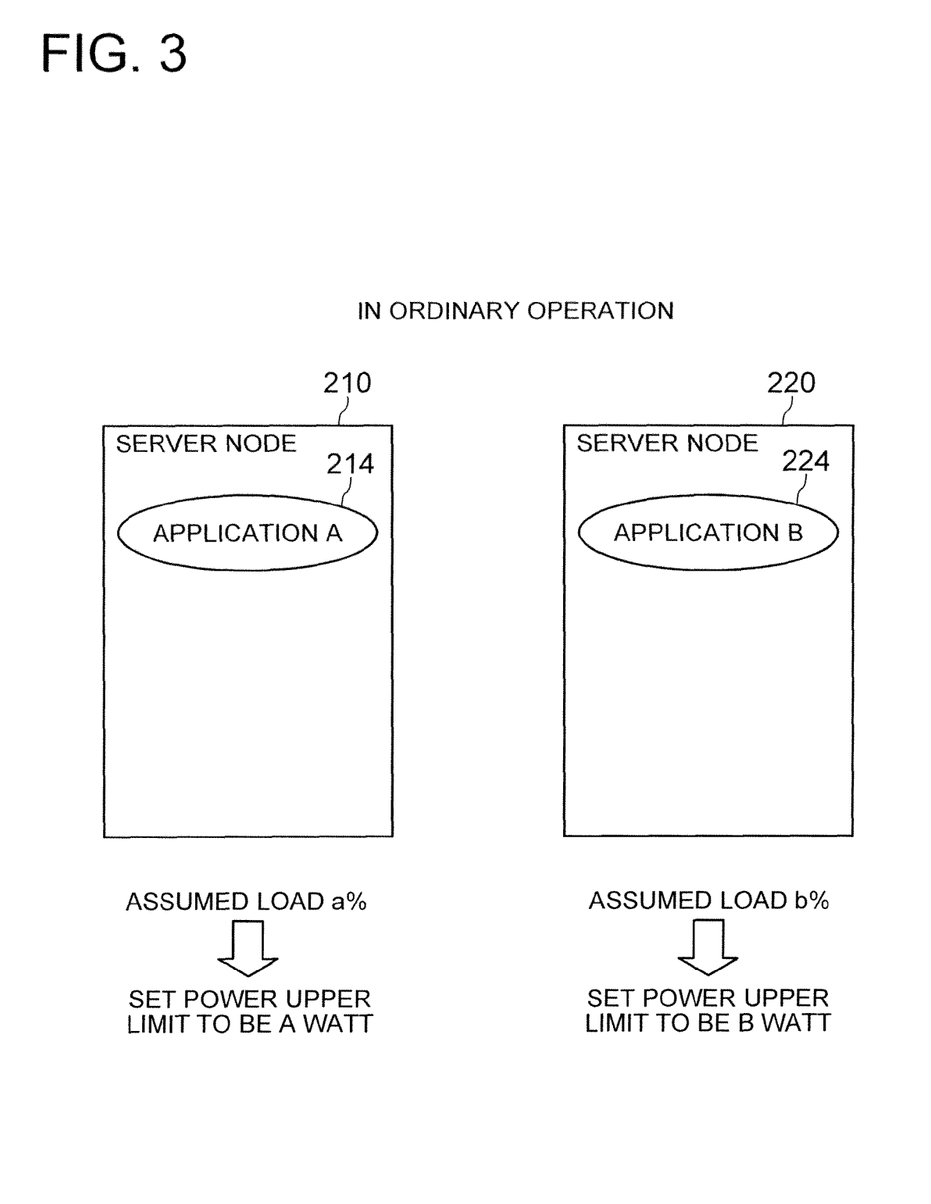
FIG. 3 shows an estimated load and a power upper limit of each server node in normal operation in the second exemplary embodiment in accordance with the present invention.

With respect to cluster systems of mutual standby type and availability-improved type, the systems are generally constructed with configurations competent enough at normal times and capable of bearing the load when taking over the process in case of problems, based on the performance estimation in system design. In the example of this performance estimation in system design shown in FIG. 3, the server nodes 210 and 220 are estimated to be a % and b % of the load, respectively. In this case, the power upper limits are set to be power A and power B, respectively. That is, the power A is the power upper limit such that the server node 210 can deliver its minimum performance or a little more without obstacles under a % of the load. Further, the power B is the power upper limit such that the server node 220 can deliver its minimum performance or a little more without obstacles under b % of the load.

Figure 4:
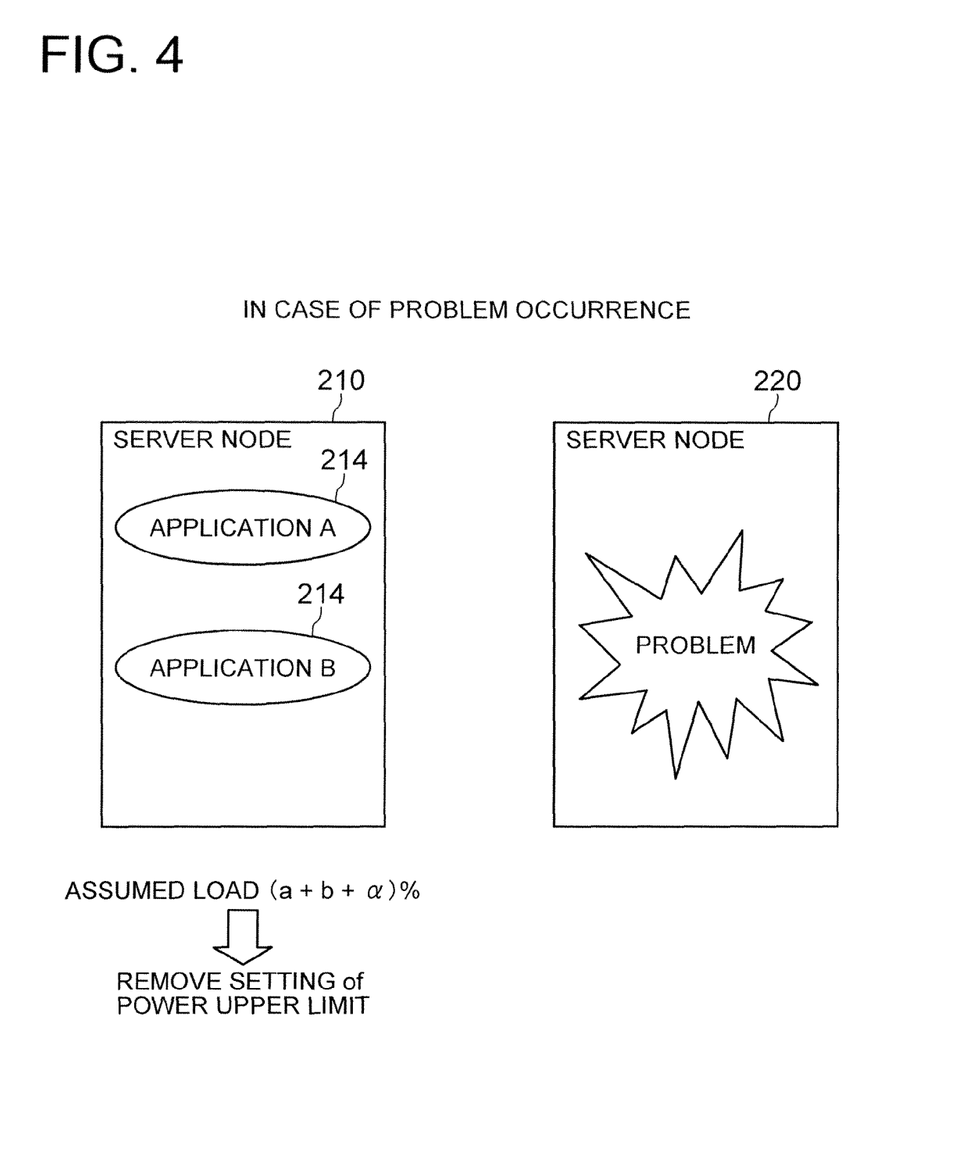
FIG. 4 shows an estimated load and a power upper limit of each server node during occurrence of problems in the second exemplary embodiment in accordance with the present invention.

On the other hand, if some problem occurs, then, as shown in FIG. 4, the applications A and B are carried out on the normal server node. In this case, the assumed load is a+b+α, and the system is designed such that this total load may not exceed the maximum performance (the maximum load) of the server node. Here, α is the load increment due to the overhead in the case of carrying out both applications simultaneously on a single server.

Figure 5:
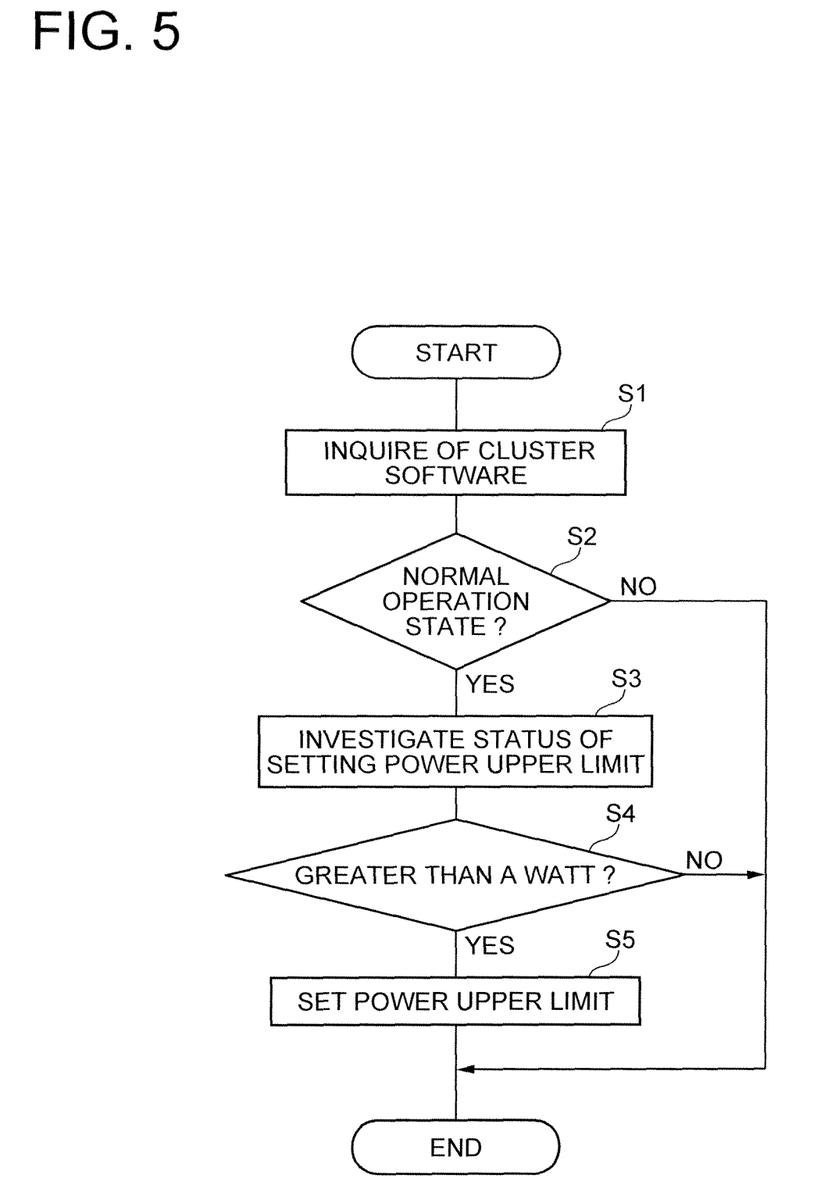
FIG. 5 is a flowcharts owing a processing example of the control software of each server node in the second exemplary embodiment in accordance with the present invention.

FIG. 5 is a flowchart showing a processing example of the control software 213 and 223. The process of FIG. 5 is repeatedly carried out at system startup and at predetermined time intervals (once every ten minutes, for example). Hereinbelow, the operation will be explained with the control software 213 as an example.

The control software 213 inquires of the cluster software 212 of its own server node 210 as to whether or not it is operating normally as a cluster system (step S1). Here, if it is not operating normally (NO at step S2), then the process shown in FIG. 5 is ended without doing anything. If it is operating normally, then, successively, the control software 213 investigates the status of the power upper limit set in the server node 210 (step S3). As a result of the investigation, if the setting value of the power upper limit is lower than A watts (NO at step S4), then it regards the power upper limit as set by other instructions than the control related to the second exemplary embodiment, and ends the process shown in FIG. 5 without changing (raising) the power upper limit. If the setting value of the power upper limit is higher than A watts, then the control software 213 sets A watts as the setting value of the power upper limit (step S5), and ends the process shown in FIG. 5. Typically, step S5 is carried out immediately after the system returns from such a state as the setting of the power upper limit has been removed.

Figure 6:
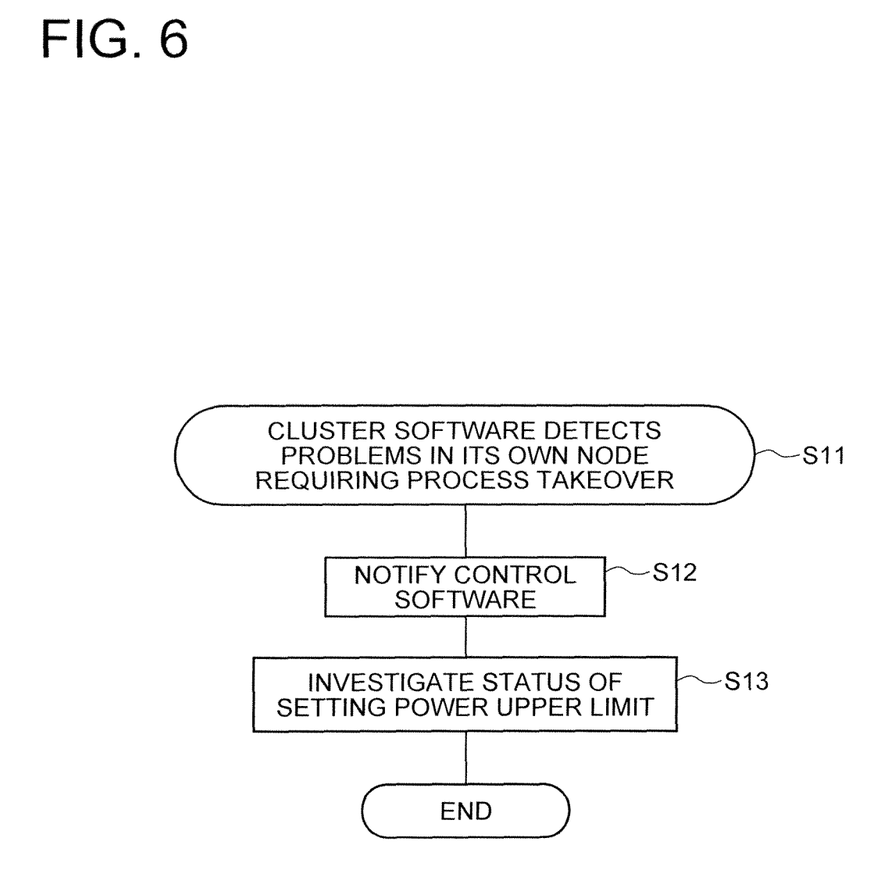
FIG. 6 is a flowchart showing a processing example during occurrence of problems in the second exemplary embodiment in accordance with the present invention.

FIG. 6 is a flowchart showing a processing example during occurrence of some problem in accordance with the second exemplary embodiment. Hereinbelow, referring to FIG. 6, explanations will be made with respect to the process of the server node 210 when problems occur in the server node 220. If the cluster software 212 of the server node 210 detects such a problem as its own node should take over the process (step S11), then it notifies the control software 213 on the same server node 210 of the cluster takeover (step S12). On receiving the notification, the control software 213 removes the setting of the power upper limit of its own server node 210 (step S13). Thereafter, the common system shifting is carried out.

By carrying out the above control, it is possible to reduce the power consumption for cluster systems of mutual standby type and availability-improved type in normal operation. The reason is that an upper limit of power consumption is set to prevent activating resources beyond assumption in operation with a redundant configuration.

Further, when activating the standby system due to the occurrence of problems, it is possible to permit the utilization of resources having stood by so as to make the necessary resources available in emergencies. The reason is that the power upper limit is removed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. Further, the information processing devices of the present invention can realize their functions not only on hardware as a matter of course, but with computers and a program as well. The program is provided in the form of being recorded in a computer-readable recording medium such as magnetic disks, semiconductor memories, and the like, and is read out by a computer at the time of starting the computer and the like to make the computer function as the control portions 113 and 123, and the like in each of the aforementioned exemplary embodiments by controlling the operation of the computer.

It is possible to utilize the present invention for reducing the power consumption of cluster systems of mutual standby type in normal operation. Further, it is possible to apply the present invention to general information processing devices such as various servers and storages which carry out their own processes only at ordinary times, but take over processes carried out by other information processing devices when problems occur in the other information processing devices or the administrator has inputted a predetermined command.

The whole or part of the exemplary embodiment disclosed above can be described as, but not limited to, the following supplementary notes.

(Supplementary Note 19)

A computer-readable medium storing a program comprising instructions for causing an information processing device forming groups each composed of a job execution system, and a job standby system for taking over the job when problems occur in the job execution system, having a job execution system and a job standby system of different groups, taking over that job with the job standby system of its own information processing device in the same group as the job execution system of another information processing device which becomes unable to continue processing, and including an upper limit storage unit for storing a power upper limit value, to function as:

a power control unit for controlling the use of power by its own information processing device so as not to exceed the power upper limit value stored in the upper limit value storage unit; and an upper limit setting unit for causing the upper limit value storage unit to store a power upper limit value smaller than the maximum power consumption of its own information processing device when it is not necessary to take over the job of another information processing device.

(Supplementary Note 20)

The computer-readable medium according to Supplementary Note 19, wherein the upper limit value setting unit changes the power upper limit value stored in the upper limit value storage unit into a greater value when it becomes necessary to take over the job of another information processing device.

(Supplementary Note 21)

The computer-readable medium according to Supplementary Note 20, wherein the upper limit value setting unit returns the power upper limit value stored in the upper limit value storage unit to the value before changed when it becomes unnecessary to take over the job of the other information processing device.

(Supplementary Note 22)

The computer-readable medium according to Supplementary Note 19, wherein the upper limit value setting unit removes the restriction on the use of power placed by the power control unit when it becomes necessary to take over the job of another information processing device.

(Supplementary Note 23)

The computer-readable medium according to Supplementary Note 22, wherein the upper limit value setting unit revalidates the restriction on the use of power placed by the power control unit when it becomes unnecessary to take over the job of the other information processing device.

(Supplementary Note 24)

The computer-readable medium according to Supplementary Note 19, wherein the information processing device further comprises a processor, and the power control unit controls the use of power by its own information processing device by changing the operating frequency of the processor.

(Supplementary Note 25)

An information processing device configured to form groups each composed of a job execution system, and a job standby system for taking over the job when problems occur in the job execution system, have a job execution system and a job standby system of different groups, and take over that job with the job standby system of its own information processing device in the same group as the job execution system of another information processing device which becomes unable to continue processing, the information processing device comprising:

an upper limit value storage means for storing a power upper limit value;

a power control means for controlling the use of power by its own information processing device so as not to exceed the power upper limit value stored in the upper limit value storage means; and an upper limit value setting means for causing the upper limit value storage means to store a power upper limit value smaller than the maximum power consumption of its own information processing device when it is not necessary to take over the job of another information processing device.

The invention claimed is:

1. A cluster system of mutual standby type configured to form groups each composed of a job execution system, and a job standby system for taking over the job when problems occur in the job execution system; and provide information processing devices each with a job execution system and a job standby system of different groups, wherein the information processing devices monitor one another while carrying out the jobs of the execution systems and, when some other information processing device becomes unable to continue processing, take over that job with the job standby system of its own information processing device in the same group as the job execution system of the other information processing device unable to continue processing, the information processing devices each comprising:

an upper limit value storage unit for storing a power upper limit value;

a power control unit for controlling the use of power by its own information processing device so as not to exceed the power upper limit value stored in the upper limit value storage unit; and an upper limit value setting unit for causing the upper limit value storage unit to store a power upper limit value smaller than the maximum power consumption of its own information processing device when it is not necessary to take over the job of another information processing device.

2. The cluster system according to claim 1, wherein the upper limit value setting unit changes the power upper limit value stored in the upper limit value storage unit into a greater value when it becomes necessary to take over the job of another information processing device.

3. The cluster system according to claim 2, wherein the upper limit value setting unit returns the power upper limit value stored in the upper limit value storage unit to the value before changed when it becomes unnecessary to take over the job of the other information processing device.

4. The cluster system according to claim 1, wherein the upper limit value setting unit removes the restriction on the use of power placed by the power control unit when it becomes necessary to take over the job of another information processing device.

5. The cluster system according to claim 4, wherein the upper limit value setting unit revalidates the restriction on the use of power placed by the power control unit when it becomes unnecessary to take over the job of the other information processing device.

6. The cluster system according to claim 1, wherein the information processing devices each further comprise a processor, and the power control unit controls the use of power by its own information processing device by changing the operating frequency of the processor of its own information processing device.

7. An information processing device configured to form groups each composed of a job execution system, and a job standby system for taking over the job when problems occur in the job execution system, have a job execution system and a job standby system of different groups, and take over that job with the job standby system of its own information processing device in the same group as the job execution system of another information processing device which becomes unable to continue processing, the information processing device comprising:

an upper limit value storage unit for storing a power upper limit value;

a power control unit for controlling the use of power by its own information processing device so as not to exceed the power upper limit value stored in the upper limit value storage unit; and an upper limit value setting unit for causing the upper limit value storage unit to store a power upper limit value smaller than the maximum power consumption of its own information processing device when it is not necessary to take over the job of another information processing device.

8. The information processing device according to claim 7, wherein the upper limit value setting unit changes the power upper limit value stored in the upper limit value storage unit into a greater value when it becomes necessary to take over the job of another information processing device.

9. The information processing device according to claim 8, wherein the upper limit value setting unit returns the power upper limit value stored in the upper limit value storage unit to the value before changed when it becomes unnecessary to take over the job of the other information processing device.

10. The information processing device according to claim 7, wherein the upper limit value setting unit removes the restriction on the use of power placed by the power control unit when it becomes necessary to take over the job of another information processing device.

11. The information processing device according to claim 10, wherein the upper limit value setting unit revalidates the restriction on the use of power placed by the power control unit when it becomes unnecessary to take over the job of the other information processing device.

12. The information processing device according to claim 7 further comprising a processor, wherein the power control unit controls the use of power by its own information processing device by changing the operating frequency of the processor.

13. A power management method of an information processing device to be carried out by the information processing device forming groups each composed of a job execution system, and a job standby system for taking over the job when problems occur in the job execution system, having a job execution system and a job standby system of different groups, taking over that job with the job standby system of its own information processing device in the same group as the job execution system of another information processing device which becomes unable to continue processing, and including an upper limit storage unit for storing a power upper limit value, the power management method comprising:

causing the upper limit value storage unit to store a power upper limit value smaller than the maximum power consumption of its own information processing device when it is not necessary to take over the job of another information processing device; and     controlling the use of power by its own information processing device so as not to exceed the power upper limit value stored in the upper limit value storage unit.

14. The power management method of the information processing device according to claim 13, wherein the power upper limit value stored in the upper limit value storage unit is changed into a greater value when it becomes necessary to take over the job of another information processing device.

15. The power management method of the information processing device according to claim 14, wherein the power upper limit value stored in the upper limit value storage unit is returned to the value before changed when it becomes unnecessary to take over the job of the other information processing device.

16. The power management method of the information processing device according to claim 13, wherein the restriction on the use of power is removed when it becomes necessary to take over the job of another information processing device.

17. The power management method of the information processing device according to claim 16, wherein the restriction on the use of power is revalidated when it becomes unnecessary to take over the job of the other information processing device.

18. The power management method of the information processing device according to claim 13, wherein the information processing device further comprises a processor; and the restriction on the use of power is to control the use of power by its own information processing device by changing the operating frequency of the processor.

* * * * *